US012741455B2

(12) United States Patent
Evans et al.

(10) Patent No.: US 12,741,455 B2
(45) Date of Patent: Sep. 22, 2026

(54) CARRIER MATERIAL LAYER

(71) Applicant: Altria Client Services LLC, Richmond, VA (US)

(72) Inventors: James D. Evans, Chesterfield, VA (US); Shannon Maxwell Black, Richmond, VA (US); Thien Hoang Nguyen, Glen Allen, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 19/256,312

(22) Filed: Jul. 1, 2025

(65) Prior Publication Data

US 2025/0326215 A1 Oct. 23, 2025

Related U.S. Application Data

(60) Continuation of application No. 18/630,395, filed on Apr. 9, 2024, now Pat. No. 12,377,644, which is a (Continued)

(51) Int. Cl.
*B32B 27/12* (2006.01)
*A24F 23/02* (2006.01)
(Continued)

(52) U.S. Cl.
CPC .............. *B32B 27/12* (2013.01); *A24F 23/02* (2013.01); *B29C 70/086* (2013.01); *B32B 3/12* (2013.01); *B32B 3/266* (2013.01); *B32B 5/022* (2013.01); *B32B 5/024* (2013.01); *B32B 27/32* (2013.01); *B32B 27/36* (2013.01); *B32B 27/40* (2013.01); *B32B 37/15* (2013.01); *B32B 38/10* (2013.01);
(Continued)

(58) Field of Classification Search
CPC ......... B32B 27/12; B32B 27/06; B32B 5/022; B29C 70/086
See application file for complete search history.

(56) References Cited

U.S. PATENT DOCUMENTS 3,200,560 A * 8/1965 Randall .............. B29C 66/1122 100/153
3,215,558 A 11/1965 Dascher
(Continued)

FOREIGN PATENT DOCUMENTS

DE 19725377 A1 12/1998
EP 280799 A1 9/1988
(Continued)

OTHER PUBLICATIONS

GD, Horizontal Flat Pouching Machine <https://www.gidi.it/en/solutions/product/sm>, accessed Apr. 11, 2019.
(Continued)

*Primary Examiner* — Gloria R Weeks
(74) *Attorney, Agent, or Firm* — Harness, Dickey & Pierce, P.L.C.

(57) ABSTRACT

At least one example embodiment relates to a composite material. In at least one example embodiment, the composite material includes an elastic layer and a support layer. The support layer is adhered to at least a portion of the elastic layer. The support layer extends across at least apportion of a surface of the elastic layer.

20 Claims, 6 Drawing Sheets

Related U.S. Application Data division of application No. 16/382,733, filed on Apr. 12, 2019, now Pat. No. 11,975,514.

(51) Int. Cl.

| | |
|---|---|
| ***B29C 70/04*** | (2006.01) |
| ***B29C 70/08*** | (2006.01) |
| ***B32B 3/12*** | (2006.01) |
| ***B32B 3/26*** | (2006.01) |
| ***B32B 5/02*** | (2006.01) |
| ***B32B 27/32*** | (2006.01) |
| ***B32B 27/36*** | (2006.01) |
| ***B32B 27/40*** | (2006.01) |
| ***B32B 37/15*** | (2006.01) |
| ***B32B 38/10*** | (2006.01) |
| ***B32B 38/18*** | (2006.01) |

(52) U.S. Cl.

CPC ...... *B32B 38/1858* (2013.01); *B32B 2307/54* (2013.01); *B32B 2307/724* (2013.01); *B32B 2439/40* (2013.01)

(56) References Cited

U.S. PATENT DOCUMENTS 3,426,505 A 2/1969 Cloud
3,498,019 A 3/1970 Rait
3,509,799 A 5/1970 Hartbauer et al.
3,519,526 A 7/1970 Bryant et al.
3,591,065 A 7/1971 Hansen, Jr. et al.
3,691,718 A 9/1972 Woodruff et al.
3,846,569 A 11/1974 Kaplan
4,118,454 A 10/1978 Miki et al.
4,359,358 A 11/1982 Hattemer
4,384,441 A 5/1983 Maruyama et al.
4,494,361 A 1/1985 Barathon et al.
4,611,456 A * 9/1986 Gillio-tos ............. B65D 75/305 426/396
4,618,384 A 10/1986 Sabee
4,676,051 A 6/1987 Hoskinson et al.
4,677,695 A * 7/1987 Van Gompel ........... B32B 27/12 428/137
4,779,400 A 10/1988 Hoskinson et al.
4,813,209 A 3/1989 Foster et al.
4,849,043 A 7/1989 Instance
5,146,730 A * 9/1992 Sadek ....................... A61J 3/10 53/553
5,192,484 A 3/1993 Matuzawa et al.
5,366,685 A 11/1994 Fujii et al.
5,391,420 A * 2/1995 Bootman .................. G09F 5/04 424/76.4
5,412,925 A 5/1995 Tani et al.
5,460,269 A * 10/1995 Bayer .................. B65D 75/305 206/524.8
5,516,581 A 5/1996 Kreckel et al.
5,519,982 A 5/1996 Herber et al.
5,682,726 A * 11/1997 Green .................. A61K 9/7023 53/433
5,683,787 A * 11/1997 Boich ..................... B32B 25/10 428/184
5,729,959 A 3/1998 Spatafora et al.
5,755,681 A 5/1998 Plews
5,853,881 A * 12/1998 Estey ...................... B32B 7/022 442/329
6,286,145 B1 9/2001 Welchel et al.
6,544,910 B2 4/2003 Himmelsbach et al.
6,996,958 B1 2/2006 Yeh et al.
7,048,013 B2 5/2006 Shannon
8,142,595 B2 3/2012 Kobayashi
8,440,043 B1 5/2013 Schneider et al.
8,628,319 B2 1/2014 Mazzarolo
8,662,880 B2 3/2014 Fowler et al.
9,084,836 B2 7/2015 Martin
9,102,132 B2 * 8/2015 Wennerback ......... B32B 37/203
9,138,975 B2 * 9/2015 Weinberg ................ B32B 27/08
9,220,804 B2 * 12/2015 Zavala .................... A61L 15/24
10,028,521 B2 * 7/2018 Carroll ................... A24B 13/00
10,259,603 B2 * 4/2019 Palumbo ................. B65B 57/12
10,406,040 B2 * 9/2019 Chatterjee ......... A61F 13/49406
11,821,121 B2 * 11/2023 Moody, III ......... B32B 37/0084
11,945,620 B2 * 4/2024 Nelson ...................... B65B 1/10
11,975,514 B2 * 5/2024 Evans ................ B32B 38/1858
12,083,779 B2 * 9/2024 Siqueira .................. B32B 27/20
2002/0164465 A1 * 11/2002 Curro .................. A61K 8/0208 442/361
2003/0138479 A1 7/2003 Mizota et al.
2004/0121683 A1 * 6/2004 Jordan ...................... B32B 5/08 442/268
2006/0003658 A1 * 1/2006 Hall ...................... A61F 13/622 442/329
2007/0267149 A1 11/2007 McCabe
2010/0106113 A1 4/2010 Heinecke
2011/0229676 A1 9/2011 Funakoshi et al.
2012/0051805 A1 3/2012 Suzuki et al.
2012/0285130 A1 11/2012 Kamigaito
2012/0322639 A1 * 12/2012 Raidel .................. A61F 13/539 493/379
2014/0047804 A1 2/2014 Evans et al.
2014/0171282 A1 * 6/2014 Hahn ................ A61F 13/15682 493/357
2014/0190638 A1 7/2014 Hull
2014/0261473 A1 9/2014 Carroll et al.
2014/0290185 A1 10/2014 Forzano
2014/0316365 A1 * 10/2014 Tsang ...................... A61F 13/49 493/393
2014/0361018 A1 12/2014 Edwards et al.
2015/0336691 A1 * 11/2015 Fowler .................. B65D 65/46 53/553
2015/0336692 A1 11/2015 Brandt Sanz et al.
2017/0050606 A1 * 2/2017 Asakuma ............ B60R 21/2165
2017/0105883 A1 * 4/2017 Nishikawa ........ A61F 13/49012
2017/0202318 A1 * 7/2017 Morishita ............. A61F 13/627
2018/0133919 A1 * 5/2018 Waterman ................ B26D 7/10
2018/0290424 A1 * 10/2018 Bang ....................... B32B 5/022
2020/0188183 A1 * 6/2020 Hamerslagh ............ A61L 15/60
2023/0257147 A1 * 8/2023 Gerber .................... B65B 47/06 53/381.1

FOREIGN PATENT DOCUMENTS

JP 2006141908 A 6/2006
JP 2012056607 A 3/2012
WO 2017/060399 A1 4/2017
WO 2017/093486 A1 6/2017

OTHER PUBLICATIONS

U.S. Appl. No. 16/382,820, filed Apr. 12, 2019.
U.S. Appl. No. 16/382,736, filed Apr. 12, 2019.
U.S. Appl. No. 15/975,087, filed May 9, 2018.
U.S. Appl. No. 16/275,927, filed Feb. 14, 2019.
U.S. Appl. No. 13/967,181, filed Aug. 14, 2013.
U.S. Appl. No. 16/382,733, filed Apr. 12, 2019.
Extended European Search Report for Application No. 20167379.5-1016, dated Aug. 5, 2020.
Communication Pursuant to Article 94(3) EPC for European Patent Application 20167379.5, dated Nov. 8, 2021 (4 pages).
United States Office Action for U.S. Appl. No. 16/382,820 dated Nov. 26, 2021 (10 pages).
U.S. Office Action dated Nov. 26, 2021 for corresponding U.S. Appl. No. 16/382,733.
United States Notice of Allowance for U.S. Appl. No. 16/382,820 dated Mar. 21, 2022.
U.S. Final Office Action dated Jun. 8, 2022 for corresponding U.S. Appl. No. 16/382,733.
U.S. Office Action dated Dec. 8, 2022 for corresponding U.S. Appl. No. 16/382,733.
United States Office Action for U.S. Appl. No. 17/851,222 dated Mar. 15, 2023.

(56) References Cited

OTHER PUBLICATIONS

U.S. Office Action dated Jun. 8, 2023 for corresponding U.S. Appl. No. 16/382,733.
United States Notice of Allowance for U.S. Appl. No. 17/851,222 dated Sep. 20, 2023 (9 pages).
European Examination Report for EP Application 20167379.5 dated Oct. 23, 2023 (4 pages).
U.S. Notice of Allowance dated Jan. 10, 2024 for corresponding U.S. Appl. No. 16/382,733.
U.S. Office Action for corresponding U.S. Appl. No. 18/407,285 dated Aug. 1, 2024 (14 pages).
U.S. Notice of Allowance dated Apr. 9, 2025 for U.S. Appl. No. 18/630,395.
U.S. Office Action for U.S. Appl. No. 19/089,386 dated Jan. 14, 2026.
U.S. Notice of Allowance for U.S. Appl. No. 19/089,386 dated Apr. 22, 2026.

* cited by examiner 10
12
16
14
18
24
22
20

10'
32
14'
28
28-2
26
16
18
28-1

34
30
1C

36

40
43
42
41
44
47
47
46
45
40'
49-2
49
42'
41
44
48
49-1
43

140
144
152
146
142
144
142
156
148
150
154
140'
158

CARRIER MATERIAL LAYER

CROSS-REFERENCE TO RELATED APPLICATION

This application is a continuation of U.S. application Ser. No. 18/630,395, filed Apr. 9, 2024, which is a divisional of U.S. application Ser. No. 16/382,733, filed Apr. 12, 2019, the entire contents of which is incorporated herein by reference thereto.

BACKGROUND

Field

The present disclosure relates to a carrier material layer to support an elastic material layer, composite materials including the carrier material layer and the elastic material layer, and/or methods of using the composite materials in manufacturing processes.

SUMMARY

At least one example embodiment relates to a composite material.

In at least one example embodiment, the composite material includes an elastic layer and a support layer. The support layer is adhered to at least a portion of the elastic layer. The support layer extends across at least a portion of a surface of the elastic layer. The support layer has a tensile strength of greater than or equal to about 98 kilogram force per meter (kgf/m) in a machine direction.

In at least one example embodiment, the composite material further comprises a first region and a second region.

In at least one example embodiment, the second region comprises a plurality of second regions.

In at least one example embodiment, each second region extends substantially parallel to the machine direction.

In at least one example embodiment, the first region comprises a plurality of first regions. Each first region of the plurality of first regions defines a substantially rectangular shape. Each first region of the plurality of first regions is disposed between two second regions of the plurality of second regions.

In at least one example embodiment, the second region comprises a pair of second regions. The pair of second regions extends along opposing edges of the composite material. The pair of second edges is substantially aligned with the opposing edges of the composite material. The first region is disposed between the pair of second regions.

In at least one example embodiment, the first region comprises a plurality of discrete first regions. Each discrete first region is defined by an enclosed perimeter. The enclosed perimeter is surrounded by the second region.

In at least one example embodiment, the support layer defines a plurality of perforations. The plurality of perforations at least partially define the first region. A first portion of the support layer in the first region is configured to be separated from a second portion of the support layer in the second region.

In at least one example embodiment, the second region comprises a first portion of the elastic layer and the support layer. The first region comprises a second portion of the elastic layer. The first region is free from the support layer.

In at least one example embodiment, the support layer comprises a woven material.

In at least one example embodiment, the support layer is configured to be separated from the elastic layer during a manufacturing process.

In at least one example embodiment, the composite material further comprises a carrier layer adhered to the elastic layer, the support layer, or both the elastic layer and the support layer.

In at least one example embodiment, the elastic layer is between the support layer and the carrier layer.

In at least one example embodiment, the support layer is between the elastic layer and the carrier layer.

In at least one example embodiment, the support layer comprises polyester, polypropylene, or a combination of polyester and polypropylene.

In at least one example embodiment, the tensile strength ranges from about 130 kgf/m to about 190 kgf/m.

In at least one example embodiment the tensile strength ranges from about 155 kgf/m to about 165 kgf/m.

In at least one example embodiment, the support layer has a basis weight of greater than or equal to about 25 grams per square meter (GSM).

In at least one example embodiment, the basis weight ranges from about 30 GSM to about 38 GSM.

In at least one example embodiment, the support layer has grab elongation of less than or equal to about 100% in the machine direction.

In at least one example embodiment, the grab elongation ranges from about 26% to about 90%.

In at least one example embodiment, the support layer has an air permeability ranging from about 100 cubic feet per minute (CFM) to about 170 CFM.

In at least one example embodiment, the air permeability ranges from about 125 CFM to about 135 CFM.

In at least one example embodiment, the elastic layer comprises a non-woven material. The non-woven material includes a plurality of fibers.

In at least one example embodiment, the elastic layer comprises a plurality of melt-blown fibers.

In at least one example embodiment, the elastic layer comprises polyurethane.

In at least one example embodiment, the elastic layer has a grab elongation of greater than about 200% in the machine direction.

In at least one example embodiment, the elastic layer has a basis weight of less than or equal to about 30 grams per square meter (GSM).

In at least one example embodiment, the elastic layer has a grab elongation of greater than or equal to about 500% in the machine direction.

In at least one example embodiment, the elastic layer has a basis weight of less than or equal to about 25 GSM.

At least one example embodiment relates to a composite material configured to be conveyed in an apparatus for encasing an oral product portion.

In at least one example embodiment, the composite material includes an elastic layer and a support layer. The elastic layer is configured to engage the oral product portion. The support layer is adhered to at least a portion of the elastic layer. The support layer extends across at least a portion of a surface of the elastic layer. The support layer has a tensile strength of greater than or equal to about 98 kgf/m in a machine direction.

In at least one example embodiment, an apparatus region of the composite material is configured to engage the apparatus so as to convey the composite material in the machine direction.

At least one example embodiment relates to a composite material.

In at least one example embodiment, the composite material includes an elastic layer and a support layer. The elastic layer has a first tensile strength in a machine direction. The support layer is adhered to at least a portion of the elastic layer and extends across at least a portion of a surface of the elastic layer. The support layer has a second tensile strength in the machine direction. The second tensile strength is greater than the first tensile strength. At least one example embodiment relates to a composite material.

In at least one example embodiment, the composite material includes an elastic layer and a support layer. The elastic layer has a first grab elongation in a machine direction. The support layer is adhered to at least a portion of the elastic layer and extends across at least a portion of a surface of the elastic layer. The support layer has a second grab elongation in the machine direction. A ratio of the first grab elongation to the second grab elongation is greater than or equal to about 2.

At least one example embodiment relates to a composite material.

In at least one example embodiment, the composite material includes an elastic layer and a support layer. The support layer is adhered to at least a portion of the elastic layer and extends across at least a portion of a surface of the elastic layer. The composite material has an air permeability ranging from about 175 cubic feet per minute (CFM) to about 225 CFM.

At least one example embodiment relates to a method of encasing a product in a pouch.

In at least one example embodiment, the method includes a conveying a first composite material having a first region and a second region in a machine direction. The conveying includes engaging the second region of the first composite material with an apparatus. The first composite material includes a first elastic layer and a support layer. The first elastic layer is in the first region and the second region. The support layer is in the second region. The method further includes depositing a product on the first elastic layer in the first region of the first composite material. The method further includes disposing a second elastic layer of a second composite material on the product. The method further includes coupling the second elastic layer to the first elastic layer to form an encased product. The method further includes creating a pouch by separating the encased product from remaining portions of the first composite material and the second composite material.

In at least one example embodiment, the method further comprises forming plurality of perforations in the support layer prior to the conveying. The plurality of perforations at least partially defines the first region. The method further includes separating a portion of the support layer in the first region from a portion of the support layer in the second region prior to the conveying.

In at least one example embodiment, the method further includes forming the first composite material. The forming comprises melt-blowing a plurality of fibers onto the support layer. The first elastic layer includes the plurality of fibers. The forming is performed prior to the conveying.

In at least one example embodiment, the method further comprises coupling the support layer to a carrier layer prior to the coupling the first elastic layer to the support layer.

In at least one example embodiment, the method further comprises separating a first portion of the support layer from a second portion of the support layer prior to the depositing. The second region of the first composite material includes the second portion of the support layer.

In at least one example embodiment, the separating is performed prior to the conveying.

In at least one example embodiment, the method further includes disposing the second portion of the support layer on a carrier layer prior to the forming.

In at least one example embodiment, the separating comprises die cutting, laser cutting, or a combination of die cutting and laser cutting.

In at least one example embodiment, the method further comprises forming the first composite material. Forming the first composite material includes printing the support layer onto a surface of the first elastic layer, extruding the support layer onto the surface of the support layer, or a combination of printing and extruding.

In at least one example embodiment, the engaging comprises applying a vacuum to draw the second region into engagement with the apparatus.

In at least one example embodiment, the method further comprises forming the first composite material. Forming the first composite material includes coupling at least a portion of the first elastic layer to at least a portion of the support layer.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figures 1A, 1B, 1C:
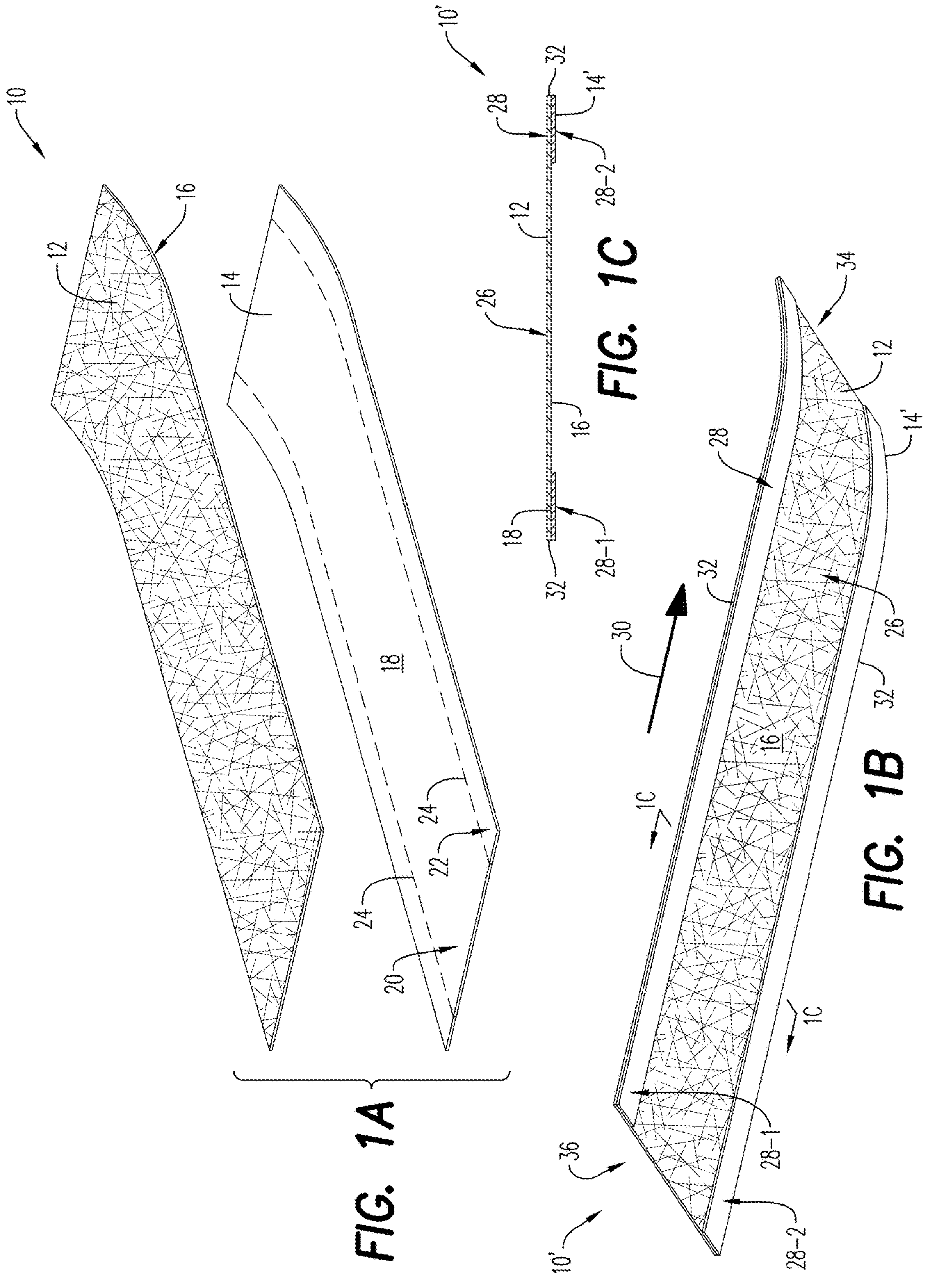
FIG. 1A is an exploded perspective view of a composite material according to at least one example embodiment.
FIG. 1B is a perspective view of the composite material of FIG. 1A, the composite material having a portion of a support layer removed.
FIG. 1C is a cross-sectional view of the composite material of FIG. 1B, taken at line 1C-1C.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes. When the terms "about" or "substantially" are used in this specification in connection with a numerical value, it is intended that the associated numerical value include a tolerance of +10% around the stated numerical value unless the context indicates otherwise.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. When the elastic layer and the support layer are removably coupled to one another, the elastic layer and the support layer can be separated upon the application of sufficient force.

FIG. 1A is an exploded perspective view of a composite material according to at least one example embodiment.

In at least one example embodiment, as shown in FIG. 1A, a composite material 10 includes a first or elastic layer 12 and a second or support layer 14. In at least one example embodiment, the elastic layer 12 comprises a sheet of non-woven elastomeric material and the support layer 14 comprises a sheet of woven material. In at least some example embodiments, the elastic layer 12 is disposed on top of the support layer 14 and extends coextensive with the support layer 14. In at least some other example embodiments, a support layer 14 may be disposed on top of the elastic layer 12 (see, e.g., the elastic layer 41 and the support layer 42 of FIGS. 1D-1E). At least a portion of the elastic layer 12 may be coupled to the support layer 14.

In at least some example embodiments, a first surface 16 of the elastic layer 12 may engage a second surface 18 of the support layer 14. In at least some example embodiments, the elastic layer 12 is coupled to the support layer 14 by physical characteristics of the elastic layer 12 and the support layer 14, for example, by adhesive friction. In at least one example embodiment, the elastic layer 12 comprises polyurethane and the support layer 14 comprises polypropylene.

The support layer 14 may include a first portion 20 and a second portion 22. In at least some example embodiments, the second portion 22 comprises a pair of second portions 22, with the first portion 20 being disposed between the pair of second portions 22. In at least some example embodiments, the first portion 20 and each of the pair of second portions 22 is generally rectangular. The second portions 22 may have substantially similar shapes and dimensions, and extend substantially parallel to one another. In at least some example embodiments, the support layer 14 may be sized, shaped, and/or sub-divided (such as into the first and second portions 20, 22) to reduce or minimize interference of the support layer 14 with regions of the elastic layer 12 that will be involved in subsequent manufacturing processes.

In at least one example embodiment, boundaries between the first and second portions 20, 22 are at least partially defined by a plurality of perforations 24 and the first portion 20 is configured to be separated from the second portions 22 at the plurality of perforations 24. In at least some example embodiments, boundaries between the first and second portions 20, 22 are separated by cuts or weak regions, such as thinner regions. Thus, the first and second portions 20, 22 may be configured to be separated from one another.

The second portion 22 of the support layer 14 may remain coupled to the elastic layer 12 when the first portion 20 is removed. In at least some example embodiments, the composite material 10 may be assembled, stored, and transported with the first and second portions 20, 22 remaining together. Accordingly, when the elastic and support layers 12, 14 are coextensive, the composite material 10 may be stored, such as on a roll or in stacks of sheets, without adjacent elastic layers 12 substantially sticking to one another. In at least some other example embodiments, the first portion 20 of the support layer 14 may be removed from the second portion 22 prior to storage and/or transport. Thus, the composite material 10 may further comprise an interleaf layer to reduce and/or prevent sticking between adjacent elastic layers 12 (not shown). In still other example embodiments, the composite material is manufactured with a support layer that includes only second portions and is substantially free of a first portion (not shown).

FIG. 1B is a perspective view of the composite material of FIG. 1A having a portion of a support layer removed according to at least one example embodiment. FIG. 1C is a cross-sectional view of the composite material of FIG. 1B, taken at line 1C-1C.

In at least one example embodiment, the first portion 20 of the support layer 14 may be removed from the composite material 10 to create a composite material 10', as shown in FIGS. 1B-1C. The composite material 10' includes the elastic layer 12 and a support layer 14'. The support layer 14' includes the pair of second portions 22, with the first portion 20 (FIG. 1A) having been removed. Accordingly, a portion of the first surface 16 of the elastic layer 12 is exposed and free to interact with a product during a manufacturing process. The composite material 10' includes a first or product region 26 and a second or apparatus region 28. The product region 26 comprises a portion of the elastic layer 12 free from the support layer 14' (e.g., where the first portion 20 of FIG. 1A has been removed). The apparatus region 28 comprises portions of the elastic layer 12 that remain with the support layer 14' (e.g., the portions where the pair of second portions 22 remain). In some embodiments, the apparatus region 28 is configured to engage an apparatus (not shown) to facilitate conveyance of the composite material 10' through the apparatus in a machine direction 30. In some embodiments, the presence of the support layer 14' in the apparatus region 28 may maintain tensile strength of the composite material 10' in the machine direction 30 to facilitate conveyance of the composite material 10' and/or may facilitate holding the composite material 10' on an apparatus (e.g., on a top surface of the apparatus) during a manufacturing process. In at least some example embodiments, the composite material 10' can be registered by and conveyed through the apparatus.

In the example embodiment shown in FIGS. 1B-1C, the apparatus region 28 includes a first apparatus region 28-1 and a second apparatus region 28-2. The first and second apparatus regions 28-1, 28-2 may be disposed on opposite sides of the product region 26. In at least one example embodiment, each of the product region 26, the first apparatus region 28-1, and the second apparatus region 28-2 is substantially rectangular. The first and second apparatus regions 28-1, 28-2 may extend along opposing edges 32 of the composite material 10'. In at least one example embodiment, the first and second apparatus regions 28-1, 28-2 extend continuously between a first end 34 of the composite material 10' and a second end 36 of the composite material 10' to maintain tensile strength of the composite material 10' as it is conveyed through an apparatus in the machine direction 30. In at least one example embodiment, the first and second apparatus regions 28-1, 28-2 extend substantially parallel to one another.

The product region 26 is free to stretch and deform (such as in a direction perpendicular to the first surface 16) to permit the performance of additional manufacturing steps, such as product placement, sealing of the elastic layer 12 to itself or to another elastic layer to form a pouch around the product, and/or cutting or other methods of separation. The first and second apparatus regions 28-1, 28-2 may continue to engage the apparatus while other manufacturing steps are performed within the product region 26.

Figures 1D, 1E:
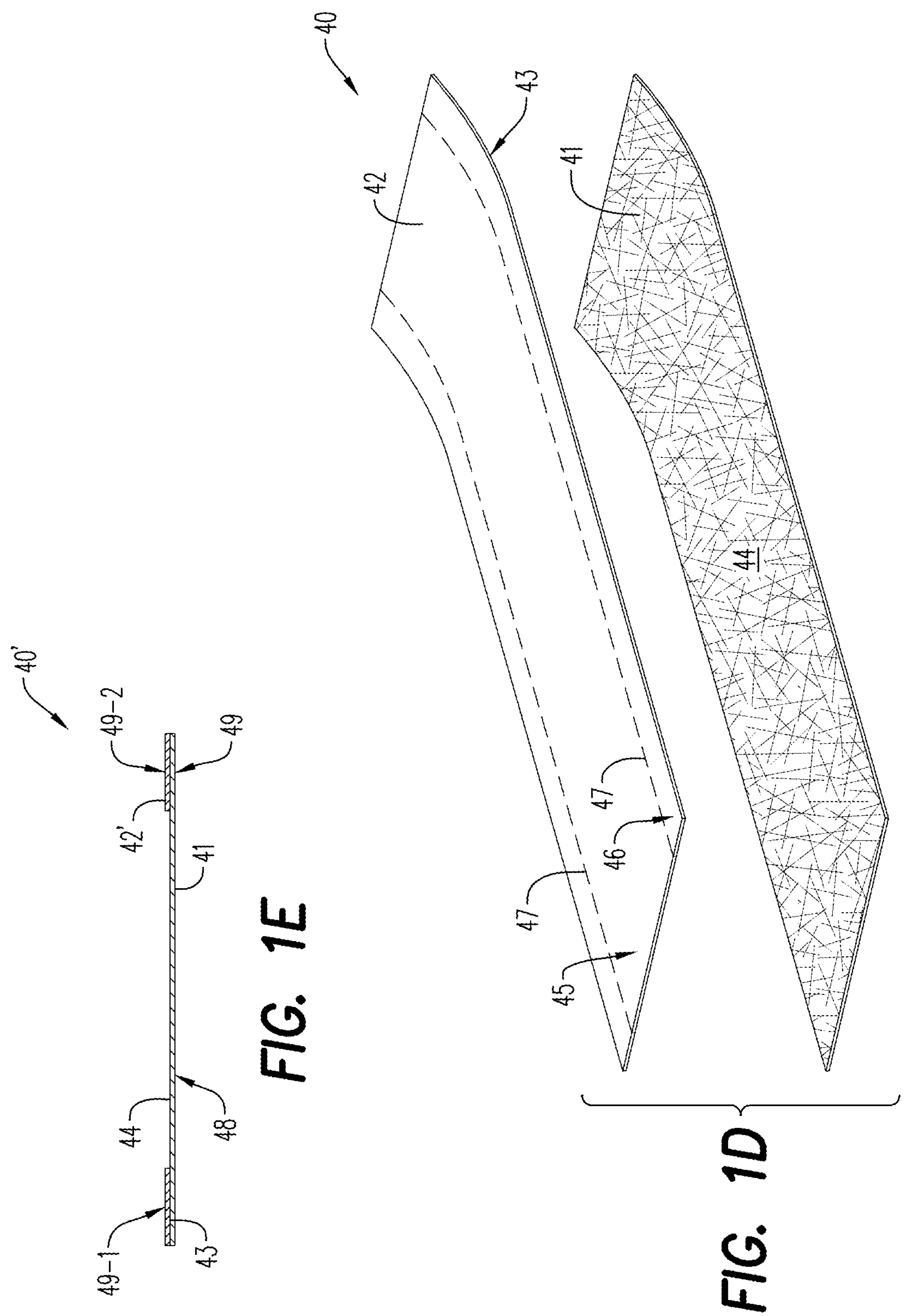
FIG. 1D is an exploded perspective view of another composite material according to at least one example embodiment.
FIG. 1E is a cross-sectional view of the composite material of FIG. 1D, the composite material having a portion of a support layer removed.

FIG. 1D is an exploded perspective view of another composite material according to at least one example embodiment.

In at least one example embodiment, as shown in FIG. 1D, a composite material 40 includes a first or elastic layer 41 and a second or support layer 42. In at least one example embodiment, the elastic layer 41 comprises a sheet of non-woven elastomeric material and the support layer 42 comprises a sheet of woven material. In at least some example embodiments, the support layer 42 is disposed on top of the elastic layer 41 and extends coextensive with the elastic layer 41.

In at least some example embodiments, a first surface 43 of the support layer 43 may engage a second surface 44 of the elastic layer 41. In at least some example embodiments, the elastic layer 41 is coupled to the support layer 42 by physical characteristics of the elastic layer 41 and the support layer 42, for example, by adhesive friction. In at least one example embodiment, the elastic layer 41 comprises polyurethane and the support layer 42 comprises polypropylene.

The support layer 42 may include a first portion 45 and a second portion 46. In at least some example embodiments, the second portion 46 comprises a pair of second portions 46, with the first portion 45 being disposed between the pair of second portions 46. In at least some example embodiments, the first portion 45 and each of the pair of second portions 46 is generally rectangular. The second portions 46 may have substantially similar shapes and dimensions, and extend substantially parallel to one another. In at least some example embodiments, the support layer 46 may be sized, shaped, and/or sub-divided (such as into the first and second portions 45, 46) to reduce or minimize interference of the support layer 46 with regions of the elastic layer 45 that will be involved in subsequent manufacturing processes.

In at least one example embodiment, boundaries between the first and second portions 45, 46 are at least partially defined by a plurality of perforations 47 and the first portion

45 is configured to be separated from the second portions 46 at the plurality of perforations 47. In at least some example embodiments, boundaries between the first and second portions 45, 46 are separated by cuts or weak regions, such as thinner regions. Thus, the first and second portions 45, 46 may be configured to be separated from one another. In at least some example embodiments, the first and second portions 45, 46 are configured to be separated from one another during a manufacturing process.

The second portion 46 of the support layer 42 may remain coupled to the elastic layer 41 when the first portion 45 is removed. In at least some example embodiments, the composite material 40 may be assembled, stored, and transported with the first and second portions 45, 46 remaining together. Accordingly, when the elastic and support layers 41, 42 are coextensive, the composite material 40 may be stored, such as on a roll or in stacks of sheets, without adjacent elastic layers 41 substantially sticking to one another. In at least some other example embodiments, the first portion 45 of the support layer 42 may be removed from the second portion 46 prior to storage and/or transport. Thus, the composite material 40 may further comprise an interleaf layer to reduce and/or prevent sticking between adjacent elastic layers 41 (not shown). In still other example embodiments, the composite material is manufactured with a support layer that includes only second portions and is substantially free of a first portion (not shown).

FIG. 1E is a cross-sectional view of the composite material of FIG. 1D, the composite material having a portion of a support layer removed.

In at least one example embodiment, the first portion 45 of the support layer 42 may be removed from the composite material 40 to create a composite material 40', as shown in FIG. 1E. The composite material 40' includes the elastic layer 41 and a support layer 42'. The support layer 42' includes the pair of second portions 46, with the first portion 45 (FIG. 1D) having been removed. Accordingly, a portion of the second surface 44 of the elastic layer 41 is exposed and free to interact with a product portion during a manufacturing process.

The composite material 40' includes a first or product region 48 and a second or apparatus region 49. The product region 48 comprises a portion of the elastic layer 41 free from the support layer 42' (e.g., where the first portion 45 of FIG. 1D has been removed). The apparatus region 49 comprises the portions of the elastic layer 41 that remain with the support layer 42' (e.g., the portions where the pair of second portions 46 remain). In some embodiments, the apparatus region 49 is configured to engage an apparatus (not shown) to facilitate conveyance of the composite material 40' through the apparatus in a machine direction. In some embodiments, the presence of the support layer 42' in the apparatus region 49 may maintain tensile strength of the composite material 40' in the machine direction to facilitate conveyance of the composite material 40' and/or may facilitate holding the composite material 40' on an apparatus (e.g., on a top surface of the apparatus) during a manufacturing process. For example, the elastic layer 41 is disposed between the support layer 42' and a surface of the apparatus. In at least some example embodiments, the composite material 40' can be registered by and conveyed through the apparatus.

In the example embodiment shown in FIG. 1E, the apparatus region 49 includes a first apparatus region 49-1 and a second apparatus region 49-2. The first and second apparatus regions 49-1, 49-2 may be disposed on opposite sides of the product region 48. In at least one example embodiment, each of the product region 48, the first apparatus region 49-1, and the second apparatus region 49-2 is substantially rectangular. The first and second apparatus regions 49-1, 49-2 may extend along opposing edges of the composite material 40'. In at least one example embodiment, the first and second apparatus regions 49-1, 49-2 extend continuously between first and second ends of the composite material 40' to maintain tensile strength of the composite material 40' as it is conveyed through an apparatus. In at least one example embodiment, the first and second apparatus regions 49-1, 49-2 extend substantially parallel to one another.

The product region 48 is free to stretch and deform (such as in a direction perpendicular to the first surface 44) to permit the performance of additional manufacturing steps, such as product placement, sealing of the elastic layer 41 to itself or to another elastic layer to form a pouch around the product, and/or cutting or other methods of separation. The first and second apparatus regions 49-1, 9-2 may continue to engage the apparatus while other manufacturing steps are performed within the product region 48.

Figures 2A, 2B, 3:
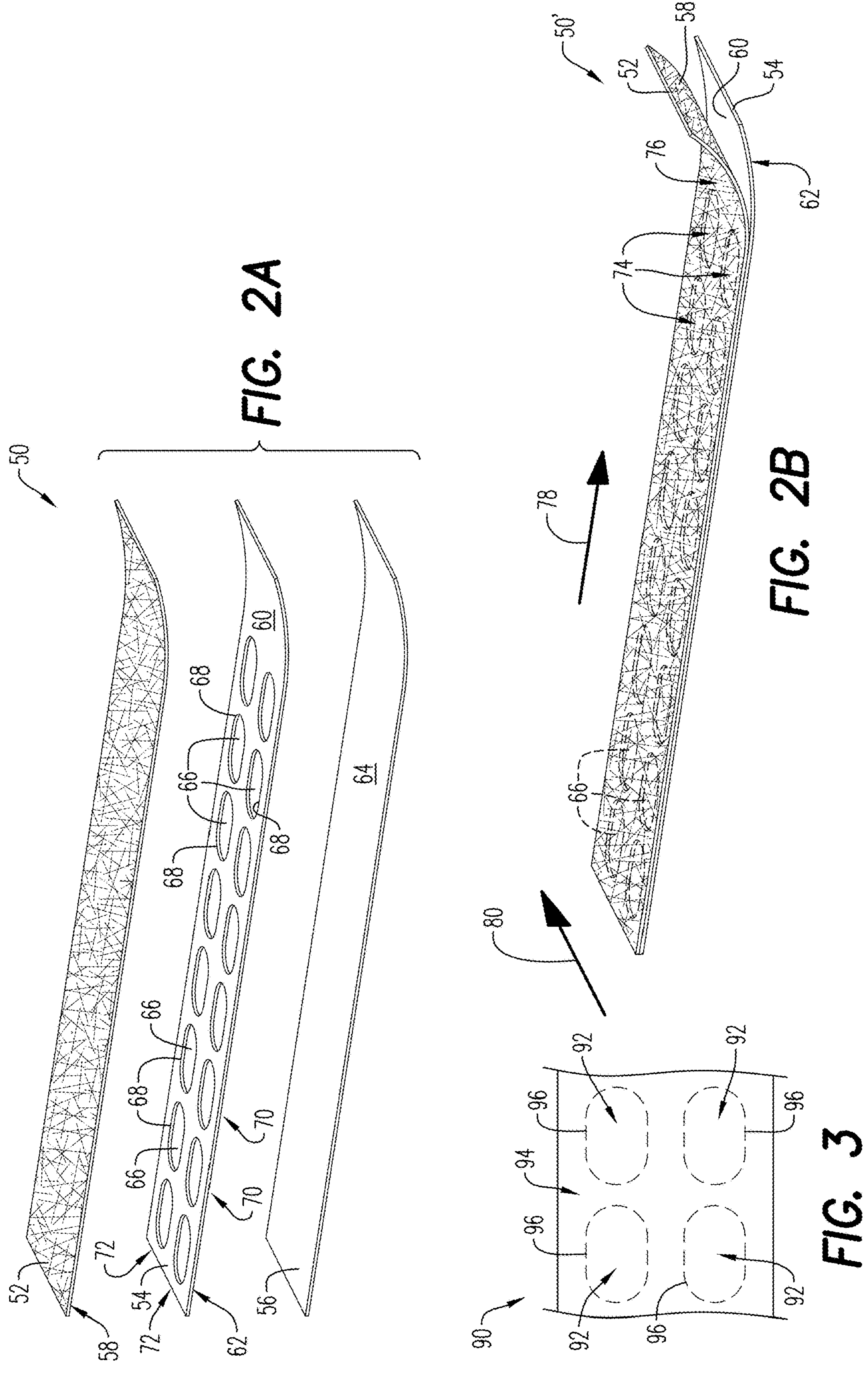
FIG. 2A is an exploded perspective view of another composite material according to at least one example embodiment.
FIG. 2B is a perspective view of the composite material of FIG. 2A, the composite material having an interleaf layer removed.
FIG. 3 is a partial view of a support layer according to at least one example embodiment, the support layer including a plurality of first portions surrounded by a second portion.

FIG. 2A is an exploded perspective view of another composite material according to at least one example embodiment.

In at least some example embodiments, as shown in FIG. 2A, a composite material 50 includes an elastic layer 52, a support layer 54, and an interleaf layer 56. The elastic layer 52, the support layer 54, and the interleaf layer 56 are stacked with one another. In at least some example embodiments, the composite material 50 may include the interleaf layer 56 during storage and transport. However, in at least some example embodiments, the interleaf layer 56 may be removed prior to use in an apparatus.

In at least some example embodiments, the support layer 54 is disposed between the elastic layer 52 and the interleaf layer 56. In at least some other example embodiments, the elastic layer 52 is disposed between the support layer 54 and the interleaf layer 56.

In at least some example embodiments, a first surface 58 of the elastic layer 52 is coupled to a second surface 60 of the support layer 54, such as by adhesive friction. In at least some example embodiments, the support layer 54 extends across only a portion of the elastic layer 52. A third surface 62 of the support layer 54 engages a fourth surface 64 of the interleaf layer 56.

In at least one example embodiment, the interleaf layer 56 slidably contacts the support layer 54. Portions of the first surface 58 of the elastic layer 52 may engage the fourth surface 64 of the interleaf layer 56. The portions of the first surface 58 may engage the fourth surface 64 via adhesive friction to prevent sliding of the elastic layer 52 with respect to the interleaf layer 56.

In at least one example embodiment, the support layer 54 is configured to be removed or decoupled from the elastic layer 52, such as after the composite material 50 is conveyed through a manufacturing process. In at least some other example embodiments, all or a portion of the elastic layer 52 may remain coupled to the support layer 54, as long as the support layer 54 does not interfere with product placement and formation. The interleaf layer 56 may be configured to be removed from the support layer 54 and the elastic layer 52 prior to conveyance of elastic and support layers 52, 54 through an apparatus.

In the example embodiment of FIG. 2A, the support layer 54 defines a plurality of apertures 66. Each aperture 66 may be at least partially defined by an enclosed perimeter 68. In at least one example embodiment, the enclosed perimeter 68 is substantially stadium-shaped. In at least some other example embodiments, the enclosed perimeter 68 may be substantially oval-shaped, elliptical, circular, polygonal, such as rectangular, square, triangular, pentagonal, hexagonal, pentagonal, or octagonal, etc., and/or any other closed shape. In at least some example embodiments, each aperture 66 has a substantially similar shape. However, in some other example embodiments, the apertures 66 may have different shapes (not shown). In at least one example embodiment, the apertures 66 may be formed by die cutting or laser cutting, prior to the support layer 54 being assembled with the elastic layer 52 and the interleaf layer 56.

In at least some example embodiments, the apertures 66 may be arranged in a plurality of rows 70 and columns 72. In the example embodiment of FIG. 2A, a quantity of columns 72 is two; however, in some embodiments, a single column 72 or more than two columns 72 may be used. The rows 70 may repeat along an entire length of the support layer 54. In at least one example embodiment, the apertures 66 are aligned in the rows 70 and the columns 72. In at least some other example embodiments, the apertures 66 may be offset in the rows 70 or the columns 72 (not shown). In at least some other example embodiments, the apertures 66 may be arranged in other patterns (not shown).

FIG. 2B is a perspective view of the composite material of FIG. 2A having an interleaf layer removed according to at least some example embodiments.

In at least some embodiments, as shown in FIG. 2B, the interleaf layer 56 may be removed from the composite material 50 to form the composite material 50'. The composite material 50' includes the elastic layer 52 and the support layer 54, but is free from the interleaf layer 56 (FIG. 2A).

The composite material 50' includes a first or product region 74 and a second or apparatus region 76. In at least some example embodiments, the product region 74 includes a plurality of discrete product regions 74. The apparatus region 76 surrounds each of the product regions 74. The product regions 74 include portions of the elastic layer 54 and are free from the support layer 54. The apparatus region 76 includes other portions of the elastic layer 52 and the support layer 54.

The apparatus region 76 is configured to engage the apparatus to facilitate conveyance of the composite material 50' through the apparatus in a machine direction 78. More particularly, the presence of the support layer 54 in the apparatus region 76 may facilitate holding the composite material 50' on an apparatus and/or maintain tensile strength of the composite material 50' in the machine direction 78. In at least some example embodiments, the support layer 54 may also maintain tensile strength of the composite material 50' in a cross direction 80 substantially perpendicular to the machine direction 78. The absence of the support layer 54 in the product regions 74 may allow for additional manufacturing steps to be performed within the product regions 74.

FIG. 3 is a partial view of a support layer according to at least one example embodiment.

In at least some example embodiments, as shown in FIG. 3, a support layer 90 includes a plurality of first portions 92 and a second portion 94. Except as otherwise described below, the support layer 90 may be similar to the support layer 54 of FIGS. 2A-2B. Each first portion 92 may be defined by a plurality of perforations 96 arranged in an enclosed perimeter. The first portions 92 may be configured to be separable from the second portion 94 at the perforations 96, such as prior to conveyance in an apparatus. In at least some example embodiments, the support layer 90 may be used in a composite material that includes an elastic layer, but is free from an interleaf layer. The elastic layer may be disposed on top of the support layer 90 and/or on a bottom of the support layer 90. Presence of the first portions 92 during storage and transport of the composite material may reduce and/or prevent adjacent elastic layers from sticking to one another, thereby reducing and/or eliminating the need for an interleaf layer.

Figures 4A, 4B, 4C:
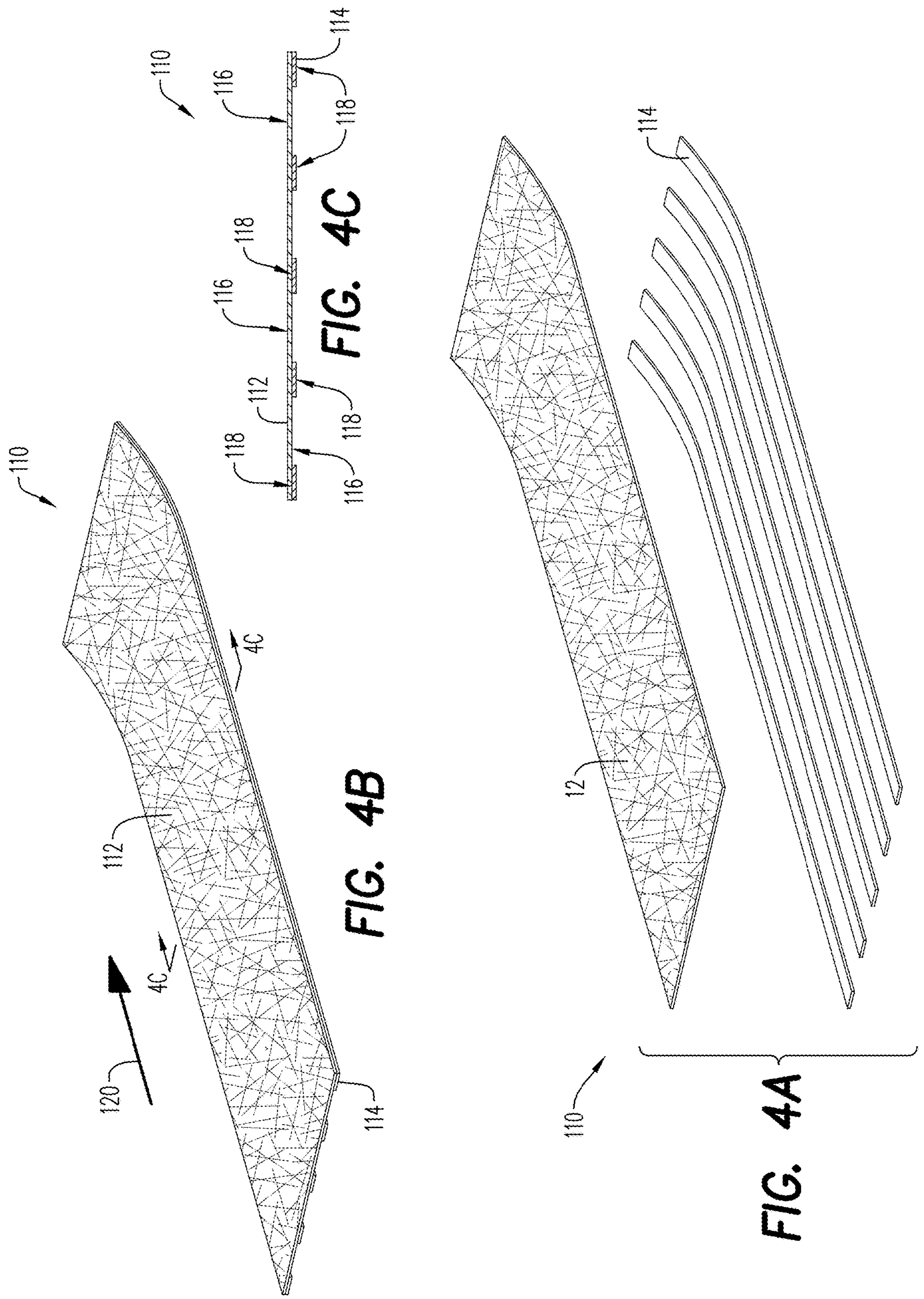
FIG. 4A is an exploded perspective view of yet another composite material according to at least one example embodiment.
FIG. 4B is a perspective view of the composite material of FIG. 4A.
FIG. 4C is a cross-sectional view of the composite material of FIG. 4A, taken at line 4C-4C of FIG. 4B.

FIG. 4A is an exploded perspective view of yet another composite material according to at least one example embodiment. FIG. 4B is a perspective view of the composite material of FIG. 4A. FIG. 4C is a cross-sectional view of the composite material of FIG. 4A, taken at line 4C-4C of FIG. 4B.

In at least some example embodiments, as shown in FIGS. 4A-4C, a composite material 110 includes an elastic layer 112 and a support layer 114 that are coupled to one another. Except as otherwise described below, the composite material 110 may be similar to the composite material 10' of FIGS. 1B-1C. In at least some example embodiments, the support layer 114 only extends across a portion of the elastic layer 112. In at least one example embodiment, the composite material 110 is free of an interleaf layer.

In at least some example embodiments, the elastic layer 112 is disposed on top of the support layer 114. However, in at least some other example embodiments, the support layer 114 may be disposed on top of the elastic layer 112.

The support layer 114 includes a plurality of strips (similar to second portions 22 of the support layer 14' of FIGS. 1B-1C) that are arranged substantially parallel to one another along a length of the composite material 110. In the example embodiment of FIGS. 4A-4C, a quantity of strips is five. In at least one example embodiment, the strips are substantially equally spaced along a width of the support layer 114. In at least some example embodiments, the strips may be formed by die cutting, laser cutting, or perforating and tearing a larger sheet of support material.

The composite material 110 may include a plurality of product regions 116 and a plurality of apparatus regions 118. The product regions 116 include portions of the elastic layer 112 and are configured for engagement with a product portion. The product regions 116 may be free from the support layer 114. The apparatus regions 118 include other portions of the elastic layer 112 and the support layer 114. At least a portion of the apparatus regions 118 is configured to engage an apparatus to facilitate conveyance of the composite material 110 through the apparatus in a machine direction 120. In at least some other example embodiments, the composite material 110 may further comprise an interleaf layer (not shown), with the support layer 114 being disposed between the elastic layer 112 and the interleaf layer.

Figures 5A, 5B:
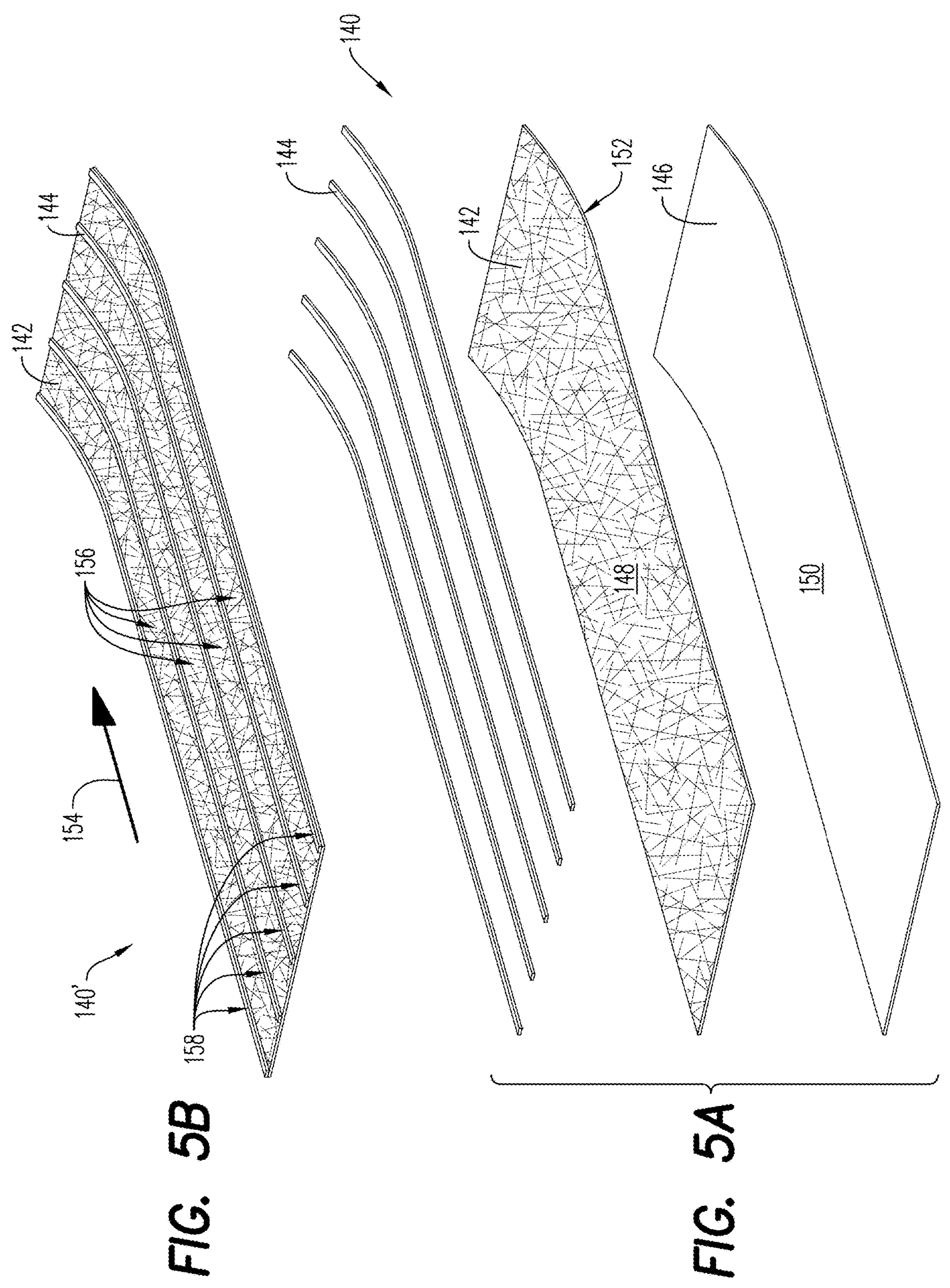
FIG. 5A is an exploded perspective view of yet another composite material according to at least one example embodiment.
FIG. 5B is a perspective view of the composite material of FIG. 5A having an interleaf layer removed.

FIG. 5A is an exploded perspective view of yet another composite material according to at least one example embodiment.

With reference to FIGS. 5A, in at least some example embodiments, a composite material 140 may include an elastic layer 142, a support layer 144, and an interleaf layer 146. In at least some example embodiments, the elastic layer 142 may be disposed between the support layer 144 and the interleaf layer 146. In at least some other example embodiments, the support layer 144 may be disposed between the elastic layer 142 and the interleaf layer 146 (see, e.g., elastic layer 182 and support layer 184 of FIG. 6).

In at least some example embodiments, the support layer 144 may be coupled to a first surface 148 of the elastic layer 142. In at least one example embodiment, the support layer 144 may be permanently coupled to the elastic layer 142. In at least some other example embodiments, the support layer 144 is embedded within the elastic layer 142. A second surface 150 of the interleaf layer 146 may engage a third surface 152 of the elastic layer 142. In at least one example embodiment, the interleaf layer 146 may be configured to slide with respect to the elastic layer 142.

In at least some example embodiments, the support layer 144 includes a plurality of elongated support structures, such as string, cord, thread, tape, wire, and/or a polymeric strip. Accordingly, in at least one example embodiment, the support layer 144 includes a plurality of elongated support structures comprising one or more of string, cord, thread, tape, wire, polymeric strip, a sub-combination thereof, or a combination thereof. In the example embodiment shown in FIG. 5A, a quantity of elongated support structures is five. The elongated support structures may extend substantially parallel to one another and be equally spaced across a width of the composite material 140. The elongated support structures may be arranged in straight lines.

In at least some other example embodiments, the elongated support structures may be arranged as curved lines (e.g., waveforms), zig-zag lines (e.g., chevrons), hashes, offset dashed lines (so that support is present along every portion of a length of the composite material 140 at some portion of the width), or any other manner that maintains a minimum tensile strength in a machine direction 154 (FIG. 5B). In at least some other example embodiments, the support layer comprises a web that is configured to maintain tensile strength in both the machine direction 154 and a substantially perpendicular cross direction.

FIG. 5B is a perspective view of the composite material of FIG. 5A having the interleaf layer removed.

In at least some example embodiments, the interleaf layer 146 may be removed from the composite material 140 to form a composite material 140', shown in FIG. 5B. The composite material 140' includes the elastic layer 142 and the support layer 144, with the interleaf layer 146 having been removed. The composite material 140' includes a plurality of product regions 156 and a plurality of apparatus regions 158. The product regions 156 include portions of the elastic layer 142 and are free from the support layer 144. The apparatus regions 158 include other portions of the elastic layer 142 and the support layer 144. At least a portion of the apparatus region 158 is configured to engage the apparatus to facilitate conveyance of the composite material 140 through the apparatus in the machine direction 154 and/or facilitate holding the composite material 140' to an apparatus. The product regions 156 are configured for engagement with a product portion.

Figure 6:
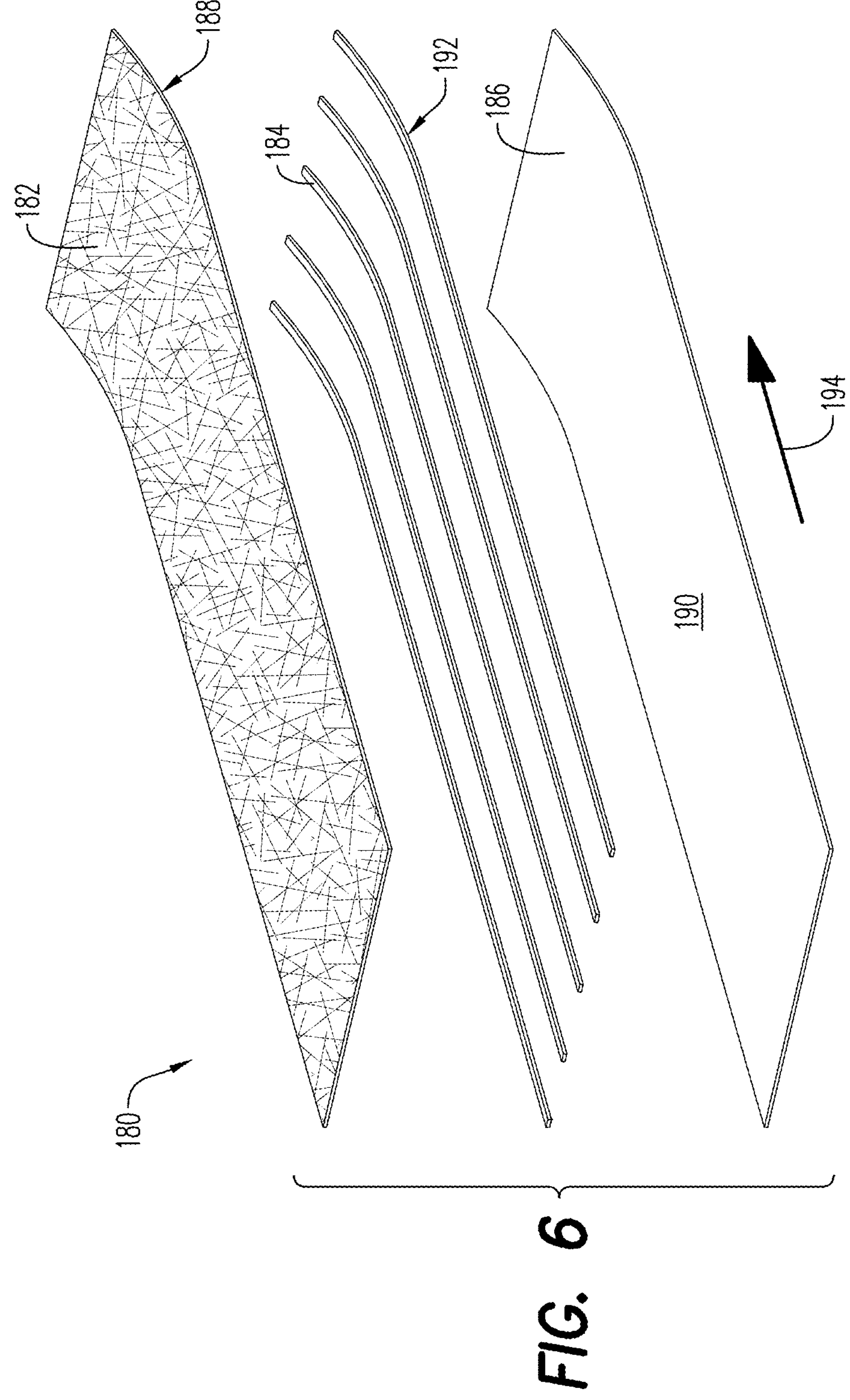
FIG. 6 is an exploded perspective view of yet another composite material according to at least one example embodiment.

FIG. 6 is an exploded perspective view of yet another composite material according to at least one example embodiment.

According to at least some example embodiments, as shown in FIG. 6, a composite material 180 includes an elastic layer 182, a support layer 184, and an interleaf layer 186. Except as otherwise described, the composite material 180 may be similar to the composite material 140 of FIGS. 5A-5B. The support layer 184 is disposed between the elastic layer 182 and the interleaf layer 186. The support layer 184 may be coupled to a first surface 188 of the elastic layer 152. A second surface 190 of the interleaf layer 186 may engage a third surface 192 of the support layer 184 and a portion of the first surface 188 if the elastic layer 182. The interleaf layer 186 may be removed from the composite material 180 to form another composite material (not shown).

In at least some example embodiments, a method of encasing a product in a pouch includes use of a composite material, such as the composite material 40 and the composite material 40' of FIGS. 1D-1E. Although the example embodiment of the invention is described in the context of FIGS. 1A-1B, any other suitable composite materials, such as those described in conjunction with FIGS. 1A-1C and/or 2A-6, may also be used in the method. Furthermore, the composite materials may be used in different manufacturing processes. For example, the composite materials may be useful in any manufacturing process that involves conveying a flexible or elastic material through a machine.

In at least some example embodiments, the method includes forming a composite material 40 by coupling at least a portion of the elastic layer 41 to the support layer 42. Coupling may include forming the elastic layer 41 onto the first surface 43 of the support layer 42. The forming may include melt-blowing, electro-spinning, or centrifugal-force-spinning. In at least one example embodiment, the elastic layer 41 is coupled to the support layer 42 by adhesive friction.

In at least one example embodiment, the method may include forming a plurality of cuts or weak regions in the support layer 42. The weak regions may include thinned regions or perforations 47. The weak regions may be formed prior to forming the composite material 40, or after forming the composite material 40.

The support layer 42 may include the first portion 45 and the second portion 46, at least partially defined by the weak regions (perforations 47). In at least some embodiments, the method may further include removing the first portion 45 from the second portion 46 to form the composite material 40'. The composite material 40' may include the elastic layer 41 and the second portion 46 of the support layer 43, referred to as the support layer 42'. The separating may be performed prior to depositing a product portion on the composite material 40', described below. In at least some other example embodiments, the separating may include die cutting or laser cutting.

In at least some example embodiments, the method includes conveying the composite material 40' through an apparatus in the machine direction. The composite material 40' includes the product region 48 and the apparatus region 49. The product region 48 includes the first portion of the elastic layer 41, and the apparatus region 49 includes the second portion of the elastic layer 41 and the support layer 42'.

The conveying includes engaging the apparatus region 49 of the composite material 40'. In at least one example embodiment, engaging includes pulling a vacuum to conform at least a portion of the first and second apparatus regions 49-1, 49-2 to a surface of the apparatus. In at least one other example, engaging includes disposing the first and second apparatus regions 28-1, 28-2 between a pair of rollers. The elastic layer 12 and the support layer 14' may remain coupled to one another during conveyance, while tensile strength of the support layer 14' facilitates sufficient engagement between the apparatus and the composite material 10'. In at least one example embodiment, the second portion of the elastic layer 41 (e.g., in the apparatus region 49) is disposed between the support layer 42' and the apparatus.

The method may further include depositing a product portion on the elastic layer 41 in the product region 48. In at least one example embodiment, the product portion may be deposited on the second surface 44 of the elastic layer 41.

The elastic layer 41 may remain free to flex and deform due to absence of the support layer 42' in the product region 48.

The method may further include disposing a second elastic layer of a second composite material (not shown), which may be substantially similar to the composite material 40 or the composite material 40', over the product portion, so that the product portion is disposed between the elastic layer 41 and the second elastic layer. In at least some other embodiments, the elastic layer 41 may be folded or wrapped around the product portion to eliminate the need of a second elastic layer.

The method may further include removing a first portion of a second support material of the second composite material (similar to the first portion 45 of the support material 42 of the composite material 40). The removing may be performed prior to the disposing, concurrently with the disposing, or after the disposing.

The method may further include coupling the second elastic layer to the elastic layer 12, such as by applying heat to soften or melt the elastic layers. Accordingly, the product portion may be encased in the elastic layers. The method further includes creating the pouch by separating the encased product from the composite material 10'. In at least one example embodiment, the sealing and cutting are performed concurrently, such as with a laser or a heat knife.

In at least some other example embodiments of a method, and with reference to FIGS. 5A-5B, forming the composite material 140 may include forming the support layer 144 onto the first surface 148 of the elastic layer 142. In at least some example embodiments, the method may further include coupling the elastic layer 142 to the interleaf layer 146. In at least one example embodiment, the forming may include printing or extrusion. In at least some other example embodiments, and with reference to FIG. 6, the support layer 184 may be formed on the first surface 188 if the elastic layer 182, such as by printing or extrusion.

In at some example embodiments, the elastic layer is in the form of a sheet. The sheet may comprise an elastomer. The elastomer may include one or more of polypropylene, polyurethane, styrene, a sub-combination thereof, or a combination thereof. In at least one example embodiment, the elastic layer comprises polyurethane. In at least some example embodiments, the elastic layer may have a low basis weight and a high elongation, and therefore have a tendency to stretch and rebound when conveyed through a typical process absent a support layer.

In at least one example embodiment, the elastic layer comprises a nonwoven fabric. The nonwoven fabric may comprise a plurality of fibers. The fibers may comprise a polymer. In at least one example embodiment, the plurality of fibers comprise an elastomer. In at least one example embodiment, the fibers consist essentially of polyurethane. The plurality fibers may comprise melt-blown fibers, electro-spun fibers, centrifugal-force-spun fibers, a sub-combination thereof, or a combination thereof.

In at least some example embodiments, the elastic layer has a basis weight of less than or equal to about 40 grams per square meter (GSM), optionally less than or equal to about 35 GSM, optionally less than or equal to about 30 GSM, optionally less than or equal to about 25 GSM, optionally less than or equal to about 20 GSM, optionally less than or equal to about 15 GSM, optionally less than or equal to about 10 GSM, optionally less than or equal to about 5 GSM. In at least some other example embodiments, the elastic layer has a basis weight of greater than or equal to about 5 GSM, optionally greater than or equal to about 10 GSM, optionally greater than or equal to about 15 GSM, optionally greater than or equal to about 20 GSM, optionally greater than or equal to about 25 GSM, or optionally greater than or equal to about 30 GSM. In at least some example embodiments, the basis weight ranges from about 10 GSM to about 30 GSM, or optionally about 15 GSM to about 25 GSM. The basis weight may range from about 10 GSM to about 15 GSM, about 15 GSM to about 20 GSM, about 20 GSM to about 25 GSM, or about 25 GSM to about 30 GSM, by way of example.

In at least some example embodiments, the elastic layer has a grab elongation in the machine direction of greater than about 100%, optionally greater than or equal to about 150%, optionally greater than or equal to about 200%, optionally greater than or equal to about 250%, optionally greater than or equal to about 300%, optionally greater than or equal to about 350%, optionally greater than or equal to about 400%, optionally greater than or equal to about 450%, or optionally greater than or equal to about 500%. In at least one example embodiment, the grab elongation in the machine direction ranges from about 200% to about 500%.

In at least one other example embodiment, an elastic layer may comprise a material similar to the elastomeric polymer pouch material set forth in U.S. Pat. No. 10,028,521 issued Jul. 24, 2018, the entire contents of which are incorporated herein by this reference thereto.

The support layer may also be referred to as a carrier or a scrim. In some example embodiments, the support layer is configured to maintain a minimum tensile strength of the composite material in the machine direction. In at least some example embodiments, the support layer is configured to maintain a minimum tensile strength of the composite material in both the machine direction and a cross direction substantially perpendicular to the machine direction. The support layer may include one or more of a sheet, such as a sheet including a woven material; a plurality of sheets; a web; a plurality of webs; an elongated support structure, such as a cord, a thread, a string, tape, a wire, or a polymeric strip; a plurality of elongated support structures; a sub-combination thereof, or a combination thereof.

In at least some example embodiments, the support layer is configured to facilitate holding a composite material on an apparatus. For example, at least a portion of the support layer may engage an apparatus, either directly or indirectly, to hold the composite material to the apparatus. In at least one example embodiment, the elastic layer is disposed between the apparatus and one or more portions of the support layer. A vacuum pulls the support layer to the apparatus, thereby holding the flexible layer between the support layer and the apparatus.

In at least some example embodiments, the support layer comprises a material that will not permanently bond to the elastic layer (see, e.g., FIGS. 1-4C). Accordingly, the support layer is configured to be removably coupled or removably adhered to the elastic layer. In at least one example embodiment, the support layer comprises polyester, polypropylene, or a combination of polyester and polypropylene. In at least some other example embodiments, the support layer is permanently adhered to the elastic layer (see, e.g., FIGS. 5A-6).

In at least some example embodiments, the support layer has a basis weight of greater than or equal to about 20 GSM, optionally greater than or equal to about 25 GSM, optionally greater than or equal to about 30 GSM, optionally greater than or equal to about 35 GSM, and optionally greater than or equal to about 40 GSM. In at least one example embodiment, the basis weight ranges from about 30 GSM to about 38 GSM, or optionally about 34 GSM.

In at least some example embodiments, the support layer has a lower machine direction grab elongation than the elastic layer. Accordingly, the elastic layer may have a first machine direction grab elongation and the support layer may have a second machine direction grab elongation that is lower than the first machine direction grab elongation. In at least some example embodiments, a ratio of first machine direction grab elongation to the second machine direction grab elongation may be greater than or equal to about 2, optionally greater than or equal to about 3, optionally greater than or equal to about 4, optionally greater than or equal to about 5, optionally greater than or equal to about 10, or optionally greater than or equal to about 15.

In at least some example embodiments, the support layer has a grab elongation in the machine direction of less than or equal to about 100%, optionally less than or equal to about 90%, optionally less than or equal to about 80%, optionally less than or equal to about 70%, optionally less than or equal to about 60%, optionally less than or equal to about 50%, optionally less than or equal to about 40%, or optionally less than or equal to about 30%. In at least some example embodiments, the grab elongation in the machine direction ranges from about 18% to about 66%, optionally about 20% to about 65%, optionally about 25% to about 60%, optionally about 30% to about 55%, optionally about 35% to about 55%, or optionally about 40% to about 50%.

In at least some example embodiments, the support layer has a grab elongation in the cross direction of less than or equal to about 100%, optionally less than or equal to about 80%, optionally less than or equal to about 60%, optionally less than or equal to about 40%, optionally less than or equal to about 30%, optionally less than or equal to about 20%, and optionally less than or equal to about 10%. In at least some example embodiments, the grab elongation in the cross direction ranges from about 8% to about 85%, optionally about 10% to about 80%, optionally about 20% to about 75%, optionally about 30% to about 70%, optionally about 40% to about 65%, or optionally about 50% to about 60%.

The support layer may generally have a higher machine-direction tensile strength than the elastic layer. Accordingly, the elastic layer may have a first tensile strength and the support layer may have a second tensile strength that is greater than the first tensile strength. In at least some example embodiments, the support layer has a tensile strength in the machine direction ranging from about 98 kilograms-force per meter width (kgf/M) to about 216 kgf/m, optionally about 100 kgf/m to about 215 kgf/m, optionally about 110 kgf/m to about 210 kgf/m, optionally about 120 kgf/m to about 200 kgf/m, optionally about 130 kgf/m to about 190 kgf/m, optionally about 140 kgf/m to about 180 kgf/m, optionally about 150 kgf/m to about 170 kgf/m, or optionally about 155 kgf/m to about 165 kgf/m. In at least one example embodiment, the tensile strength in the machine direction ranges from about 100 kgf/m to about 110 kgf/m. In at least one other example embodiment, the tensile strength in the machine direction ranges from about 110 kgf/m to about 120 kgf/m. In at least one other example embodiment, the tensile strength in the machine direction ranges from about 120 kgf/m to about 130 kgf/m. In at least one other example embodiment, the tensile strength in the machine direction ranges from about 130 kgf/m to about 140 kgf/m. In at least one other example embodiment, the tensile strength in the machine direction ranges from about 140 kgf/m to about 150 kgf/m. In at least one other example embodiment, the tensile strength in the machine direction ranges from about 150 kgf/m to about 160 kgf/m. In at least one other example embodiment, the tensile strength in the machine direction ranges from about 160 kgf/m to about 170 kgf/m. In at least one other example embodiment, the tensile strength in the machine direction ranges from about 170 kgf/m to about 180 kgf/m. In at least one other example embodiment, the tensile strength in the machine direction ranges from about 180 kgf/m to about 190 kgf/m. In at least one other example embodiment, the tensile strength in the machine direction ranges from about 190 kgf/m to about 200 kgf/m. In at least one other example embodiment, the tensile strength in the machine direction ranges from about 200 kgf/m to about 215 kgf/m. In at least some example embodiments, the tensile strength in the machine direction is greater than or equal to about 98 kgf/m, optionally greater than or equal to about 100 kgf/m, optionally greater than or equal to about 110 kgf/m, optionally greater than or equal to about 120 kgf/m, optionally greater than or equal to about 130 kgf/m, optionally greater than or equal to about 135 kgf/m, optionally greater than or equal to about 140 kgf/m, optionally greater than or equal to about 145 kgf/m, optionally greater than or equal to about 150 kgf/m, optionally greater than or equal to about 155 kgf/m, and optionally greater than or equal to about 160 kgf/m.

In at least some example embodiments, the support layer has a tensile strength in the cross direction ranging from about 10 kgf/m to about 200 kgf/m, optionally about 25 kgf/m to about 190 kgf/m, optionally about 40 kgf/m to about 180 kgf/m, optionally about 55 kgf/m to about 170 kgf/m, optionally about 70 kgf/m to about 160 kgf/m, optionally about 85 kgf/m to about 150 kgf/m, optionally about 100 kgf/m to about 140 kgf/m, optionally about 105 kgf/m to about 135 kgf/m, optionally about 110 kgf/m to about 130 kgf/m, or optionally about 115 kgf/m to about 125 kgf/m.

In at least some example embodiments, the support layer has an air permeability ranging from about 80 cubic feet per minute (CFM) to about 200 CFM, optionally about 90 CFM to about 185 CFM, optionally about 100 CFM to about 170 CFM, optionally about 110 CFM to about 155 CFM, optionally about 115 CFM to about 145 CFM, optionally about 120 CFM to about 140 CFM, or optionally about 125 CFM to about 135 CFM. In at least one example embodiment, the support layer has an air permeability ranging from about 80 CFM to about 90 CFM. In at least one example embodiment, the support layer has an air permeability ranging from about 90 CFM to about 100 CFM. In at least one other example embodiment, the support layer has an air permeability ranging from about 100 CFM to about 110 CFM. In at least one other example embodiment, the support layer has an air permeability ranging from about 110 CFM to about 120 CFM. In at least one other example embodiment, the support layer has an air permeability ranging from about 120 CFM to about 130 CFM. In at least one other example embodiment, the support layer has an air permeability ranging from about 130 CFM to about 140 CFM. In at least one other example embodiment, the support layer has an air permeability ranging from about 140 CFM to about 150 CFM. In at least one other example embodiment, the support layer has an air permeability ranging from about 150 CFM to about 160 CFM. In at least one other example embodiment, the support layer has an air permeability ranging from about 160 CFM to about 170 CFM. In at least one other example embodiment, the support layer has an air permeability ranging from about 170 CFM to about 180 CFM. In at least one other example embodiment, the support layer has an air permeability ranging from about 180 CFM to about 190

CFM. In at least one other example embodiment, the support layer has an air permeability ranging from about 190 CFM to about 200 CFM.

In at least some example embodiments, a thickness of the support layer ranges from about 0.1 mm to about 1 mm, optionally about 0.1 mm to about 0.75 mm, optionally about 0.25 mm to about 0.5 mm. In at least one example embodiment, the thickness ranges from about 0.331 mm to about 0.471 mm, optionally about 0.191 mm. A color of the support layer may be white, off-white, tan, or brown, by way of example. In at least one example embodiment, the color of the support layer is white.

In at least some example embodiments, the support layer includes a first portion and a second portion. The second portion may be configured to be engaged by the apparatus, while the first portion is configured to be separable from the second portion. In at least some example embodiments, the support layer may include weak regions, such as perforations, that at least partially define the first and second portions. The support layer may be configured to separate at the weak regions upon application of appropriate force to create open spaces (see, e.g., FIG. 1A, FIG. 3). In at least some other example embodiments, the support layer includes one or more open spaces that are integrally formed with the material of the support layer, or formed in post-processing (e.g., die cutting, laser cutting). The open spaces may be continuous along the machine direction (see, e.g., FIGS. 1B-1C, and 4A-6), continuous along the cross direction, or discrete (see, e.g., FIGS. 2A-2B).

In at least some example embodiments, a composite material comprises an elastic layer and a support layer. In at least one example embodiment, the composite material has combined thickness ranging from about 1 mm to about 5 mm, optionally about 1.5 mm to about 4.5 mm, optionally about 2 mm to about 4 mm, or optionally about 2.5 mm to about 3.5 mm. In at least some example embodiments, the composite material has a basis weight ranging from about 40 GSM to about 70 GSM, optionally about 45 GSM to about 65 GSM, optionally about 50 GSM to about 60 GSM, or optionally about 50 GSM to 55 GSM. In at least some example embodiments, the composite material has an air permeability ranging from about 175 CFM to about 225 CFM, optionally about 180 CFM to about 220 CFM, optionally about 185 CFM to about 215 CFM, optionally about 190 CFM to about 210 CFM, or optionally about 195 CFM to about 205 CFM.

In at least some example embodiments, the composite material further comprises an interleaf layer. The interleaf layer is configured to prevent adjacent elastic layers or portions of elastic layers from sticking to one another. In at least one example embodiment, the composite material may include the interleaf layer when support layer includes the open spaces. In at least some example embodiments, the interleaf layer comprises a polymeric material. In at least one example embodiment, the support layer comprises polyester, polypropylene, or a combination of polyester and polypropylene. In at least some other example embodiments, the composite material both includes open spaces and omits the interleaf layer, such as when the elastic layer does not stick to itself.

In at least some example embodiments, the elastic layer is used to enclose a product portion, such as in a pouch formed from one or more sheets of elastic layers. In at least some example embodiments, the product portion is an oral product. The oral product may be a tobacco product, a nicotine product, or a non-tobacco product.

An oral tobacco product may include smokeless tobacco that is placed in the mouth and not combusted. Smokeless tobacco exists in various forms, such as chewing tobacco, moist smokeless tobacco, snus, dry snuff, etc. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed between an adult tobacco consumer's cheek and gum. Snus is a heat treated smokeless tobacco. Dry snuff is finely ground tobacco that is placed in the mouth or used nasally.

A nicotine product may include tobacco-derived nicotine, non-tobacco-derived nicotine, and/or nicotine derivative.

Tensile strength and elongation data for a support layer according to at least one example embodiment is displayed in Table 1, below. The support layer comprises polypropylene. The support layer has a basis weight of 1 ounce per square yard.

Each sample is a 1 inch by 3 inch rectangle cut from a support layer. The support layer may be configured to be conveyed through an apparatus in a machine direction, as described above. For machine direction testing, the 3-inch dimension is parallel to the machine direction and the 1-inch dimension is parallel to a cross-direction substantially parallel to the machine direction. For cross-direction testing, the 3-inch dimension is parallel to the cross direction and the 1-inch dimension is parallel to the machine direction. The samples are clamped within a pair of grips on a SHIMADZU Universal Testing machine equipped with a 50 N load cell. The grips are spaced about 2.5 inches from one another. A stroke speed is set to about 254 mm/min.

TABLE 1

| Support Layer | Sample | Direction | Tensile Strength (Force at Break) (kgf/m) | Elongation at break (%) |
|---|---|---|---|---|
| 1 | 1a | Machine | 148.3 | 46.17 |
| 1 | 1b | Cross | 92.97 | 46.56 |
| 2 | 2a | Machine | 183.7 | 49.63 |
| 2 | 2b | Cross | 131.92 | 49.98 |
| 3 | 3a | Machine | 166.56 | 40.87 |
| 3 | 3c | Cross | 104.28 | 52.89 |
| 4 | 4a | Machine | 146.53 | 45.32 |
| 4 | 4b | Cross | 119.14 | 58.63 |
| 5 | 5a | Machine | 175.38 | 50.2 |
| 5 | 5b | Cross | 128.17 | 62.53 |
| 6 | 6a | Machine | 173.27 | 51.32 |
| 6 | 6b | Cross | 114.17 | 51.47 |
| 7 | 7a | Machine | 136.99 | 46.67 |
| 7 | 7b | Cross | 116.67 | 52.19 |
| 8 | 8a | Machine | 167.67 | 52.46 |
| 8 | 8b | Cross | 58.74 | 28.45 |
| 9 | 9a | Machine | 158.91 | 37.47 |
| 9 | 9b | Cross | 150.23 | 59.32 |
| 10 | 10a | Machine | 130.14 | 31.16 |
| 10 | 10b | Cross | 137.02 | 63.3 |
| 11 | 11a | Machine | 155.58 | 36.56 |
| 11 | 11b | Cross | 121.57 | 63.41 |
| 12 | 12a | Machine | 166.76 | 42.15 |
| 12 | 12b | Cross | 137.03 | 64.47 |

Air permeability data for a support layer according to at least one example embodiment is displayed in Table 2, below. The support layer comprises polypropylene. The support layer has a basis weight of 1 ounce per square yard.

Each sample is placed to cover 38 $cm^2$ orifice on a TEXTEST FX 3300 air permeability tester. A test pressure is set to 25 Pa. For each sample, vacuum is turned on and a measuring range is adjusted until the display is green and a volumetric flow rate is displayed. The volumetric flow rate displayed represents air permeability.

TABLE 2

| Sample | Air Permeability (CFM) |
|---|---|
| 1 | 123 |
| 2 | 121 |
| 3 | 110 |
| 4 | 132 |
| 5 | 131 |
| 6 | 120 |
| 7 | 133 |
| 8 | 119 |
| 9 | 111 |
| 10 | 127 |
| 11 | 132 |
| 12 | 130 |
| 13 | 127 |
| 14 | 152 |
| 15 | 123 |
| 16 | 140 |
| 17 | 123 |
| 18 | 116 |
| 19 | 118 |
| 20 | 122 |
| 21 | 119 |
| 22 | 168 |
| 23 | 139 |
| 24 | 131 |
| 25 | 137 |
| 26 | 114 |
| 27 | 111 |
| 28 | 132 |
| 29 | 162 |
| 30 | 140 |
| 31 | 130 |
| 32 | 141 |
| 33 | 110 |
| 34 | 140 |

The invention claimed is:

1. A composite material, comprising:

a first layer having a first tensile strength in a machine direction, the first layer including, a non-woven material including, a plurality of elastomeric fibers; and a second layer directly on the first layer and extending across at least a portion of a surface of the first layer, the second layer having a second tensile strength in the machine direction, the second tensile strength greater than the first tensile strength, the second layer including, a pair of outer portions, an inner portion between the pair of outer portions, and perforations between the inner portion and each of the pair of outer portions, the inner portion configured to be separated from the first layer and the pair of outer portions.

2. The composite material of claim 1, wherein the perforations include, a first line of perforations in the machine direction, and a second line of perforations in the machine direction.

3. The composite material of claim 1, wherein the second layer includes a woven material.

4. The composite material of claim 1, wherein the plurality of elastomeric fibers include melt-blown fibers.

5. The composite material of claim 1, wherein the first layer includes polyurethane, and the second layer includes polyester, polypropylene, or a combination of polyester and polypropylene.

6. The composite material of claim 1, further comprising:

a third layer on the first layer or the second layer.

7. The composite material of claim 1, wherein the first layer has a first grab elongation in the machine direction, and the second layer has a second grab elongation in the machine direction, the first grab elongation greater than the second grab elongation.

8. The composite material of claim 7, wherein a ratio of the first grab elongation to the second grab elongation is greater than or equal to about 2.

9. The composite material of claim 7, wherein the first grab elongation is greater than or equal to 200% in the machine direction, and the second grab elongation is less than or equal to 100% in the machine direction.

10. The composite material of claim 9, wherein the first grab elongation is greater than or equal to 500% in the machine direction, and the second grab elongation ranges from 26% to 90%.

11. The composite material of claim 1, wherein the second tensile strength is greater than or equal to 98 kilogram-feet per meter (kgf/m).

12. The composite material of claim 1, wherein the second tensile strength ranges from 155 kgf/m to 165 kgf/m.

13. The composite material of claim 1, wherein the second layer has a third tensile strength in a cross direction perpendicular to the machine direction, the third tensile strength ranging from 10 kilogram-feet per meter (kgf/m) to 200 kgf/m.

14. The composite material of claim 1, wherein the first layer has a first basis weight of less than or equal to 30 grams per square meter (gsm), and the second layer has a second basis weight of greater than or equal to 25 gsm.

15. The composite material of claim 14, wherein the first basis weight is less than or equal to 25 gsm, and the second basis weight is greater than or equal to about 30 gsm to 38 gsm.

16. The composite material of claim 1, wherein the second layer has an air permeability ranging from 100 cubic feet per meter (CFM) to 170 CFM.

17. The composite material of claim 16, wherein the air permeability of the second layer ranges from 125 CFM to 135 CFM.

18. The composite material of claim 1, wherein the second layer defines a thickness ranging from 0.1 millimeters (mm) to 1 mm).

19. The composite material of claim 6, wherein the first layer is between the second layer and the third layer.

20. A composite material configured to be conveyed in an apparatus for encasing an oral product portion, the composite material comprising:

a first layer configured to engage the oral product portion, the first layer having a first tensile strength in a machine direction, the first layer including, a non-woven material including, a plurality of elastomeric fibers; and a second layer configured to engage the apparatus so as to convey the composite material in the machine direction, the second layer directly on the first layer and extending across at least a portion of a surface of the first layer, the second layer configured to be separated from the first layer, the second layer having a second tensile strength in the machine direction, the second tensile strength greater than the first tensile strength, the second layer including, a pair of outer portions,
an inner portion between the pair of outer portions, and
perforations between the inner portion and each of the pair of outer portions, the inner portion configured to be separated from the pair of outer portions along the perforations.

* * * * *